United States Patent
Chan et al.

(10) Patent No.: US 11,108,554 B2
(45) Date of Patent: *Aug. 31, 2021

(54) TRACEABLE KEY BLOCK-CHAIN LEDGER

(71) Applicant: eBay Inc., San Jose, CA (US)

(72) Inventors: Michael J. T. Chan, Cupertino, CA (US); Sean R. Embry, San Jose, CA (US); Derek A. Chamorro, Austin, TX (US); Anuj Kaul, San Jose, CA (US); Sahil Chadha, San Jose, CA (US); Nikhil Firke, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,690

(22) Filed: Apr. 7, 2020

(65) Prior Publication Data
US 2020/0235926 A1 Jul. 23, 2020

Related U.S. Application Data

(63) Continuation of application No. 15/858,949, filed on Dec. 29, 2017, now Pat. No. 10,715,323.

(51) Int. Cl.
*G06F 21/64* (2013.01)
*H04L 9/08* (2006.01)
(Continued)

(52) U.S. Cl.
CPC ............ *H04L 9/0894* (2013.01); *G06F 21/64* (2013.01); *H04L 9/002* (2013.01); *H04L 9/0637* (2013.01);
(Continued)

(58) Field of Classification Search
CPC ..... H04L 9/002; H04L 9/0637; H04L 9/0819; H04L 9/0861; H04L 9/0891;
(Continued)

(56) References Cited

U.S. PATENT DOCUMENTS

| 5,557,088 A | 9/1996 | Shimizu et al. |
| 5,607,350 A | 3/1997 | Levasseur et al. |

(Continued)

FOREIGN PATENT DOCUMENTS

| CN | 106130738 A | 11/2016 |
| CN | 106777923 A | 5/2017 |

(Continued)

OTHER PUBLICATIONS

A Tech Startup Wants to Use Blockchain to Make Event Tickets Fraud-Proof, Retrieved from the Internet URL: <https://www.forbes.com/sites/forbestreptalks/2017/06/15/a-tech-startup-upgraded-wants-to-use-blockchain-to-make-event-tickets-fraud-proof-and-to-sell-more-stuff-to-fans/#41659e3a7ffa>, Jun. 15, 2017, 5 pages.

(Continued)

*Primary Examiner* — Olugbenga O Idowu
(74) *Attorney, Agent, or Firm* — Shook, Hardy & Bacon L.L.P.

(57) ABSTRACT

Techniques are shown for key tracing using a traceable key block-chain ledger involving, in response to detection of an attack on a resource protected by a cryptographic key, retrieving a key block-chain ledger corresponding to the cryptographic key having one or more transaction blocks. Each transaction block corresponds to a key transaction with the cryptographic key and includes metadata describing the key transaction with the cryptographic key. Metadata from the transaction blocks in the key block-chain ledger is used to trace the key transactions of the cryptographic key to a point of attack. A transaction block corresponding to the point of attack is determined and an alert is generated indicating the point of attack with metadata from the transaction block corresponding to the point of attack.

20 Claims, 8 Drawing Sheets

(51) Int. Cl.
- *H04L 9/00* (2006.01)
- *H04L 9/06* (2006.01)
- *H04L 9/14* (2006.01)
- *H04L 9/30* (2006.01)
- *H04L 9/32* (2006.01)

(52) U.S. Cl.
CPC .............. *H04L 9/08* (2013.01); *H04L 9/0861* (2013.01); *H04L 9/0891* (2013.01); *H04L 9/14* (2013.01); *H04L 9/30* (2013.01); *H04L 9/3247* (2013.01); *H04L 2209/38* (2013.01)

(58) Field of Classification Search
CPC . H04L 9/0894; H04L 9/14; H04L 9/30; H04L 9/3247; H04L 2209/38; H04L 9/08; G06F 21/64
See application file for complete search history.

(56) References Cited

U.S. PATENT DOCUMENTS

| | | | |
|---|---|---|---|
| 7,627,531 | B2 | 12/2009 | Breck et al. |
| 7,656,271 | B2 | 2/2010 | Ehrman et al. |
| 9,635,000 | B1 | 4/2017 | Muftic |
| 9,641,342 | B2 | 5/2017 | Sriram et al. |
| 9,680,799 | B2 | 6/2017 | Iyer et al. |
| 9,722,790 | B2 | 8/2017 | Ebrahimi |
| 9,749,140 | B2 | 8/2017 | Oberhauser et al. |
| 9,749,297 | B2 | 8/2017 | Gvili |
| 9,774,578 | B1 | 9/2017 | Ateniese et al. |
| 9,794,074 | B2 | 10/2017 | Toll et al. |
| 10,715,323 | B2 | 7/2020 | Chan et al. |
| 2004/0024688 | A1 | 2/2004 | Bi et al. |
| 2006/0100965 | A1 | 5/2006 | Simelius |
| 2013/0174272 | A1 | 7/2013 | Chevalier et al. |
| 2013/0219458 | A1 | 8/2013 | Ramanathan |
| 2015/0302400 | A1 | 10/2015 | Metral |
| 2015/0332283 | A1 | 11/2015 | Witchey |
| 2016/0028552 | A1 | 1/2016 | Spanos et al. |
| 2016/0191243 | A1 | 6/2016 | Manning |
| 2016/0203572 | A1 | 7/2016 | Mcconaghy et al. |
| 2016/0284033 | A1 | 9/2016 | Winand |
| 2016/0300234 | A1 | 10/2016 | Moss-Pultz et al. |
| 2016/0321752 | A1 | 11/2016 | Tabacco |
| 2016/0330034 | A1 | 11/2016 | Back et al. |
| 2016/0335533 | A1 | 11/2016 | Davis |
| 2016/0342976 | A1 | 11/2016 | Davis |
| 2016/0342977 | A1 | 11/2016 | Lam |
| 2016/0379212 | A1 | 12/2016 | Bowman et al. |
| 2017/0005804 | A1 | 1/2017 | Zinder |
| 2017/0011460 | A1 | 1/2017 | Molinari et al. |
| 2017/0046526 | A1* | 2/2017 | Chan .............. G06Q 10/063114 |
| 2017/0046651 | A1 | 2/2017 | Lin |
| 2017/0046664 | A1 | 2/2017 | Haldenby et al. |
| 2017/0048209 | A1 | 2/2017 | Lohe et al. |
| 2017/0103385 | A1 | 4/2017 | Wilson et al. |
| 2017/0103390 | A1 | 4/2017 | Wilson et al. |
| 2017/0109735 | A1 | 4/2017 | Sheng et al. |
| 2017/0116693 | A1 | 4/2017 | Rae |
| 2017/0132630 | A1 | 5/2017 | Castinado et al. |
| 2017/0149560 | A1 | 5/2017 | Shah |
| 2017/0177898 | A1 | 6/2017 | Dillenberger |
| 2017/0232300 | A1 | 8/2017 | Tran et al. |
| 2017/0236102 | A1 | 8/2017 | Biton |
| 2017/0236103 | A1 | 8/2017 | Biton |
| 2017/0236104 | A1 | 8/2017 | Biton |
| 2017/0237570 | A1 | 8/2017 | Vandervort |
| 2017/0243193 | A1 | 8/2017 | Manian et al. |
| 2017/0250796 | A1 | 8/2017 | Samid |
| 2017/0300627 | A1 | 10/2017 | Giordano et al. |
| 2017/0302663 | A1 | 10/2017 | Nainar |
| 2017/0308872 | A1 | 10/2017 | Uhr et al. |
| 2017/0317997 | A1 | 11/2017 | Smith et al. |
| 2017/0329980 | A1 | 11/2017 | Hu et al. |
| 2017/0331810 | A1 | 11/2017 | Kurian |
| 2017/0337534 | A1 | 11/2017 | Goeringer et al. |
| 2017/0366353 | A1 | 12/2017 | Struttmann |
| 2018/0018723 | A1 | 1/2018 | Nagla et al. |
| 2018/0025442 | A1 | 1/2018 | Isaacson et al. |
| 2018/0173719 | A1 | 6/2018 | Bastide et al. |
| 2018/0257306 | A1 | 9/2018 | Mattingly et al. |
| 2018/0294957 | A1 | 10/2018 | O'brien et al. |
| 2018/0330348 | A1 | 11/2018 | Uhr et al. |
| 2018/0330349 | A1 | 11/2018 | Uhr et al. |
| 2018/0349621 | A1 | 12/2018 | Schvey et al. |
| 2018/0349893 | A1 | 12/2018 | Tsai |
| 2019/0102409 | A1 | 4/2019 | Shi et al. |
| 2019/0109713 | A1* | 4/2019 | Clark .................... H04L 9/3239 |
| 2019/0205558 | A1 | 7/2019 | Gonzales, Jr. |
| 2019/0205563 | A1 | 7/2019 | Gonzales, Jr. |
| 2019/0205870 | A1 | 7/2019 | Kamalsky et al. |
| 2019/0205873 | A1 | 7/2019 | Kamalsky et al. |
| 2019/0205894 | A1 | 7/2019 | Gonzales, Jr. et al. |
| 2019/0207759 | A1 | 7/2019 | Chan et al. |
| 2019/0207995 | A1 | 7/2019 | Gonzales, Jr. |
| 2020/0012763 | A1 | 1/2020 | Arngren et al. |

FOREIGN PATENT DOCUMENTS

| | | |
|---|---|---|
| CN | 106920169 A | 7/2017 |
| CN | 107070644 A | 8/2017 |
| CN | 107077682 A | 8/2017 |
| CN | 107086909 A | 8/2017 |
| KR | 101781583 B1 | 9/2017 |
| WO | 2016/128567 A1 | 8/2016 |
| WO | 2017/004527 A1 | 1/2017 |
| WO | 2017/006136 A1 | 1/2017 |
| WO | 2017/027900 A1 | 2/2017 |
| WO | 2017/066002 A1 | 4/2017 |
| WO | 2017/090041 A1 | 6/2017 |
| WO | 2017/098519 A1 | 6/2017 |
| WO | 2017/145003 A1 | 8/2017 |
| WO | 2017/145017 A1 | 8/2017 |
| WO | 2017/145047 A1 | 8/2017 |
| WO | 2017/148245 A1 | 9/2017 |
| WO | 2017/163069 A1 | 9/2017 |
| WO | 2017/163220 A1 | 9/2017 |
| WO | 2017/178956 A1 | 10/2017 |
| WO | 2017/182601 A1 | 10/2017 |
| WO | 2017/195160 A1 | 11/2017 |
| WO | 2017/196701 A1 | 11/2017 |
| WO | 2019/133307 A1 | 7/2019 |
| WO | 2019/133308 A1 | 7/2019 |
| WO | 2019/133309 A1 | 7/2019 |
| WO | 2019/133310 A1 | 7/2019 |

OTHER PUBLICATIONS

Blockchain in Ticketing. Why do ticketing companies need it?—Softjourn, Retrieved from the Internet URL: <https://softjourn.com/blockchain-in-ticketing>, Accessed on Sep. 11, 2018, 7 pages.

Blockchain Secure Event Ticketing for Music, Festivals and Meetups, Retrieved from the Internet URL: <https://eventchain.io/>, Accessed on Sep. 11, 2018, 9 pages.

Blockchain Startups Take on Ticket Touting, But Will They Gain Traction?, Retrieved from the Internet URL: <https://www.coindesk.com/blockchain-startups-take-ticket-touting-will-gain-traction/>, Jul. 31, 2017, 5 pages.

Blocktix-An Ethereum event hosting platform designed for the real world, Retrieved from the Internet URL: <https://blog.blocktix.io/blocktix-an-ethereum-event-hosting-plafform-designed-for-the-real-world-d52f8a838ecc>, Jan. 25, 2017, 3 pages.

Cloudchain—Ticketing Platform Based on Blockchain—Reply, Retrieved from the Internet URL: <http://www.reply.com/en/content/blockchain-ticketing-solution-cloudchain>, Accessed on Sep. 11, 2018, 3 pages.

Crypto.tickets, Retrieved from the Internet URL: <https://blog.crypto.tickets/>, Accessed on Sep. 11, 2018, 2 pages.

Ethereum Wallets are Enabling Transaction Scheduling, Killer Feature, Ethereum News, Retrieved from the Internet URL: <https://

(56) References Cited

OTHER PUBLICATIONS www.ccn.com/ethereum-wallets-are-enabling-transaction-scheduling-killer-feature/>, Sep. 18, 2018, 6 pages.
Guts Tickets—Honest ticketing, Retrieved from the Internet URL: <https://guts.tickets/>, Accessed on Sep. 11, 2018, 9 pages.
The Alarm Service Is Now Available on the Testnet, Retrieved from the Internet URL: <http://blog.ethereum-alarm-clock.com/blog/2016/1/16/the-alarm-service-is-now-available-on-the-testnet>, Jan. 16, 2016, 2 pages.
The Aventus Protocol: Blockchain for Ticketing, Retrieved from the Internet URL: <https://aventus.io/>, Accessed on Sep. 11, 2018, 9 pages.
Upgraded Tickets, Retrieved from the Internet URL: <https://www.upgraded-inc.com/>, Accessed on Sep. 11, 2018, 14 pages.
Written Opinion received for PCT Patent Application No. PCT/US2018/065854, dated Feb. 21, 2019, 6 pages.
International Search Report received for PCT Application No. PCT/US2018/065860, dated Feb. 19, 2019, 3 pages.
International Written Opinion received for PCT Application No. PCT/US2018/065860, dated Feb. 19, 2019, 6 pages.
Ramachandran, "Using Blockchain and smart contracts for secure data provenance management," Sep. 28, 2017, pp. 1-11.
Notice of Allowance received for U.S. Appl. No. 16/020,969, dated May 18, 2020, 16 pages.
Steichen, et al., "Blockchain-Based, Decentralized Access Control for IPFS" Retrieved from the Internet URL: <https://www.researchgate.net/publication/327034734>, Jul. 2018, 9 pages.
Non-Final Office Action received for U.S. Appl. No. 16/020,975, dated Feb. 28, 2020, 12 pages.
Szabo, "Smart Contracts: Building Blocks for Digital Markets", Retrieved online from the Internet URL: <http://www.alamut.com/subj/economics/nick_szabo/smartContracts.html>, 1996, pp. 1-17.
Triantafyllidis, "Developing an Ethereum Blockchain Application", Retrieved from the Internet URL: <http://www.delaat.net/rp/2015-2016/p53/report.pdf > Feb. 19, 2016, 59 pages.
White Paper, "White Paper: PGP Key Management Server from Symantec", An Introduction to PGP Key Management Server from Symantec, 2010, 17 pages.
Zhang, "Orthogonality Between Key Privacy and Data Privacy", ResearchGate, Revisited, Conference Paper, Aug. 2007, 17 pages.
Restriction Requirement Received for U.S. Appl. No. 16/041,671, dated Mar. 30, 2020, 7 pages.
Applicant Initiated Interview Summary Received for U.S. Appl. No. 16/041,680, dated May 1, 2020, 3 Pages.
International Written Opinion received for PCT Application No. PCT/US2018/065851, dated Feb. 18, 2019, 6 pages.
Non Final Office Action Received for U.S. Appl. No. 16/041,680, dated Feb. 26, 2020, 10 pages.
International Search Report received for PCT Application No. PCT/US2018/065852, dated Feb. 19, 2019, Feb. 19, 2019, 4 pages.
Response to Non-Final Office Action filed on May 18, 2020 for U.S. Appl. No. 16/041,680, dated Feb. 26, 2020, 16 pages.
Applicant Initiated Interview Summary Received for U.S. Appl. No. 16/181,814, dated May 5, 2020, 3 Pages.
International Search Report received for PCT Application No. PCT/US2018/065854, dated Feb. 21, 2019, Feb. 21, 2019, 3 pages.
Response to Non- Final Office Action Filed on May 14, 2020 for U.S. Appl. No. 16/181,814, dated Feb. 20, 2020, 20 Pages.
International Written Opinion received for PCT Application No. PCT/US2018/065852, dated Feb. 19, 2019, Feb. 19, 2019, 6 pages.
Ateniese et al., "Redactable Blockchain—or—Rewriting History in Bitcoin and Friends", IEEE European Symposium on Security and Privacy, May 11, 2017, 38 pages.

Bidder Coin, "Bidder Coin, Bidder Coin White Paper, Dec. 28, 2017, pp. 36", Dec. 28, 2017, 36 pages.
Chainfrog, "What are Smart Contracts?", Retrieved from the Internet URL: <http://www.chainfrog.com/wp-content/uploads/2017/08/smart-contracts.pdf>, 2017, 13 pages.
Chen et al., "Under-Optimized Smart Contracts Devour Your Money", Retrieved from the Internet URL: <https://arxiv.org/pdf/1703.03994.pdf >, Mar. 11, 2016, 5 pages.
Chronologic, "Temporal Innovation on the Blockchain", Retrieved from the Internet URL: <https://chronologic.network/uploads/Chronologic_Whitepaper.pdf>, Oct. 11, 2018, 25 pages.
Ethereum, "blockchain—How can a contract run itself at a later time?", Retrieved from the Internet URL:<https://ethereum.stackexchange.com/questions/42/how-can-a-contract-run-itself-at-a-later-time>, Accesses date on Sep. 24, 2018, 12 pages.
Gollapudi, "White Paper—A Next-Generation Smart Contract and Decentralized Application Platform", Retrieved from the Internet URL: < https://github.com/ethereum/wiki/wiki/White-Paper/f18902f4e7fb21dc92b37e8a0963eec4b3f4793a >, May 29, 2017, pp. 1-23.
Kehrli, "Blockchain Explained", Retrieved from the Internet URL: <https://www.niceideas.ch/blockchain_explained.pdf>, Oct. 7, 2016, pp. 1-25.
Kishigami et al., "The Blockchain-Based Digital Content Distribution System", 2015 IEEE Fifth International Conference on Big Data and Cloud Computing, Aug. 1, 2015, pp. 187-190.
International Search Report received for PCT Application No. PCT/US2018/065851, dated Feb. 18, 2019, 4 pages.
Corrected Notice of Allowability received for U.S. Appl. No. 15/858,949, dated Jun. 10, 2020, 2 pages.
Non-Final Office Action Received for U.S. Appl. No. 15/858,949, dated Aug. 30, 2019, 10 pages.
Response to Non-Final Office Action filed on Nov. 21, 2019, for U.S. Appl. No. 15/858,949, dated Aug. 30, 2019, 14 pages.
Notice of Allowance received for U.S. Appl. No. 15/858,949, dated Feb. 3, 2020, 6 pages.
Applicant Initiated Interview Summary Received for U.S. Appl. No. 16/020,975, dated Jun. 2, 2020, 2 pages.
Response to Non-Final Office Action filed on May 22, 2020 for U.S. Appl. No. 16/020,975, dated Feb. 28, 2020, 15 pages.
Notice of Non Compliant Amendment received for U.S. Appl. No. 16/041,671, dated Apr. 23, 2020, 2 pages.
Response to Notice of Non-Compliant Amendment filed on Jun. 22, 2020 , for U.S. Appl. No. 16/041,671, dated Apr. 23, 2020, 14 Pages.
Response to Restriction Requirement filed on Apr. 17, 2020 for U.S. Appl. No. 16/041,671, dated Mar. 30, 2020, 15 Pages.
Corrected Notice of Allowability received for U.S. Appl. No. 16/041,680, dated Jul. 8, 2020, 2 pages.
Notice of Allowance received for U.S. Appl. No. 16/041,680, dated Jun. 10, 2020, 8 pages.
Non Final Office Action Received for U.S. Appl. No. 16/181,814, dated Feb. 20, 2020, 20 pages.
Supplemental Amendment Filed on Jul. 10, 2020 for U.S. Appl. No. 16/181,814, dated Feb. 20, 2020, 12 pages.
International Preliminary Report on Patentability received for PCT Application No. PCT/US2018/065851, dated Jul. 9, 2020, 8 pages.
International Preliminary Report on Patentability Received for PCT Application No. PCT/US2018/065852, dated Jul. 9, 2020, 8 pages.
International Preliminary Report on Patentability received for PCT Application No. PCT/US2018/065854, dated Jul. 9, 2020, 8 pages.
International Preliminary Report on Patentability received for PCT Application No. PCT/US2018/065860, dated Jul. 9, 2020, 8 pages.

* cited by examiner

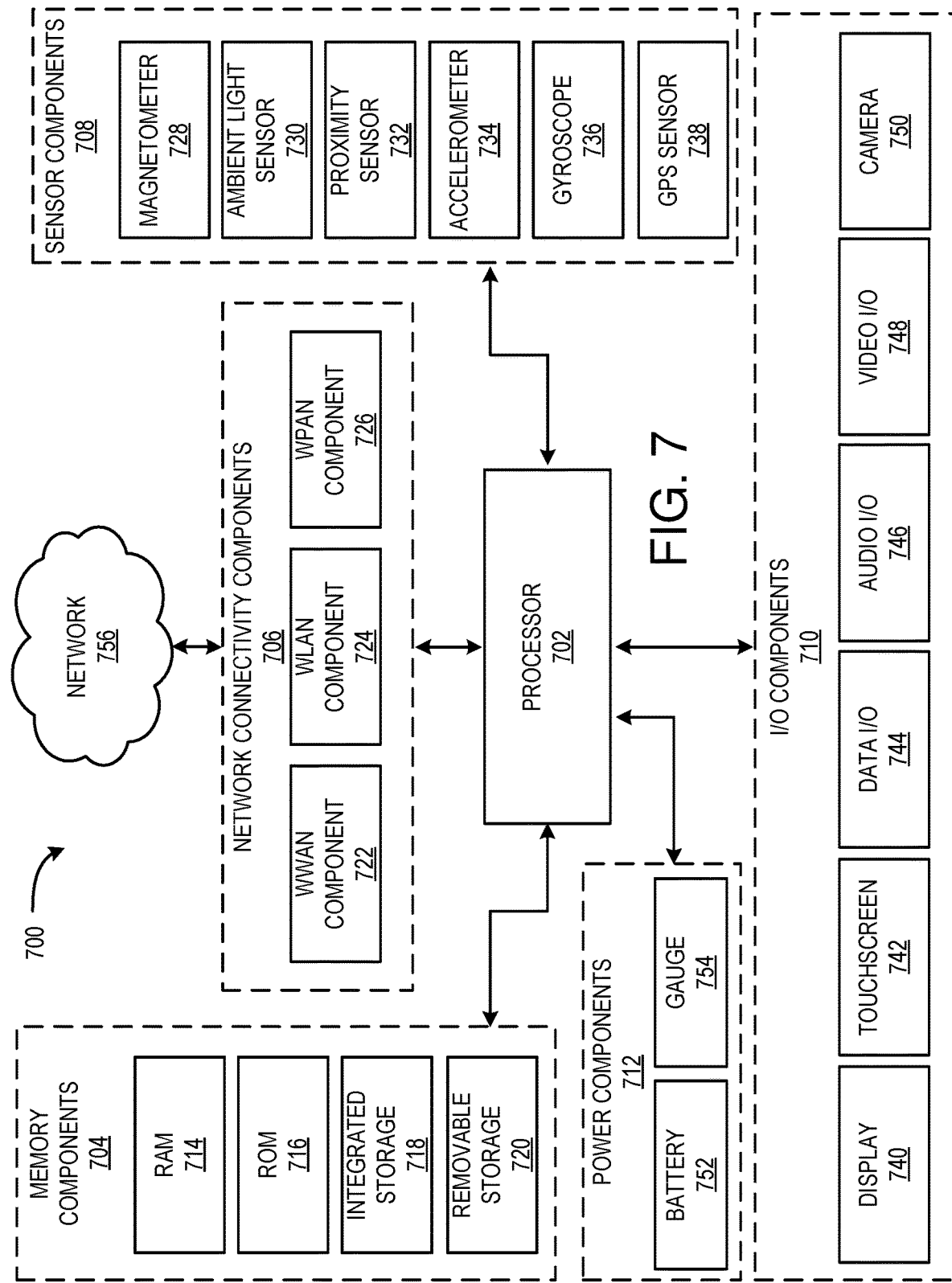

TRACEABLE KEY BLOCK-CHAIN LEDGER

CROSS REFERENCE TO RELATED APPLICATIONS

This application is a continuation of U.S. patent application Ser. No. 15/858,949 for "TRACEABLE KEY BLOCK-CHAIN LEDGER" filed Dec. 29, 2017, herein incorporated by reference in its entirety for all purposes.

BACKGROUND

Key management is the management of cryptographic keys in an encrypted system and includes dealing with the generation, exchange, storage, use, destruction and replacement of keys. It typically includes cryptographic protocols, key servers, and user procedures. When keys are created in many key management systems, the key typically includes a cryptographic certificate to govern how the key is used, the agency that is attesting for the key, and lifecycle policies for the key.

It is with respect to these and other considerations that the disclosure made herein is presented.

SUMMARY

The techniques disclosed herein are directed to a traceable key block-chain ledger. The disclosed technology involves generating transaction blocks representing key transactions and chaining the blocks in an unbroken block-chain to create a secure and traceable key block-chain ledger. Mechanisms are provided for adding metadata to each transaction block that logs information relevant to the key transaction, e.g. operations performed on the key, data the key was applied to, libraries utilizing the key, and machines where operations were performed on the key or where the key resides.

The disclosed key block-chain ledger can be used to extend key traceability to certain aspects of a key. The metadata in the key block-chain ledger enables the key to be traced during a key audit even when a key operation, e.g. a key rotation, is performed that modifies the key such that the original key cannot be derived from the original key. This may allow the key to be traced to a point of attack if the key becomes compromised.

In various examples, techniques for key management are shown that involve creating a cryptographic key at a key source, generating a genesis block for a key block-chain ledger corresponding to the cryptographic key, and securely modifying the genesis block to include metadata describing the key source. These techniques also involve performing a first key transaction with the cryptographic key, generating a first transaction block corresponding to the first key transaction with the cryptographic key and adding the first transaction block to the key block-chain ledger, and securely modifying the first transaction block to include metadata describing the first key transaction with the cryptographic key. In some examples, securely modifying a transaction block involves modifying the transaction block using a block-chain emend or amend functionality to include metadata describing a key transaction. One example of a key transaction is rotation of a key.

In another aspect of the techniques disclosed herein, the techniques involve detecting an attack on data or a system associated with the cryptographic key. This aspect further involves using metadata of the transaction blocks in the key block-chain ledger to trace the cryptographic key to a point of attack and determining transaction block corresponding to the point of attack. This aspect also involves generating an alert indicating the point of attack with metadata from the transaction block corresponding to the point of attack.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 7 is a computer architecture diagram illustrating a computing device architecture for a computing device capable of implementing aspects of the techniques and technologies presented herein.

DETAILED DESCRIPTION

Figure 1:
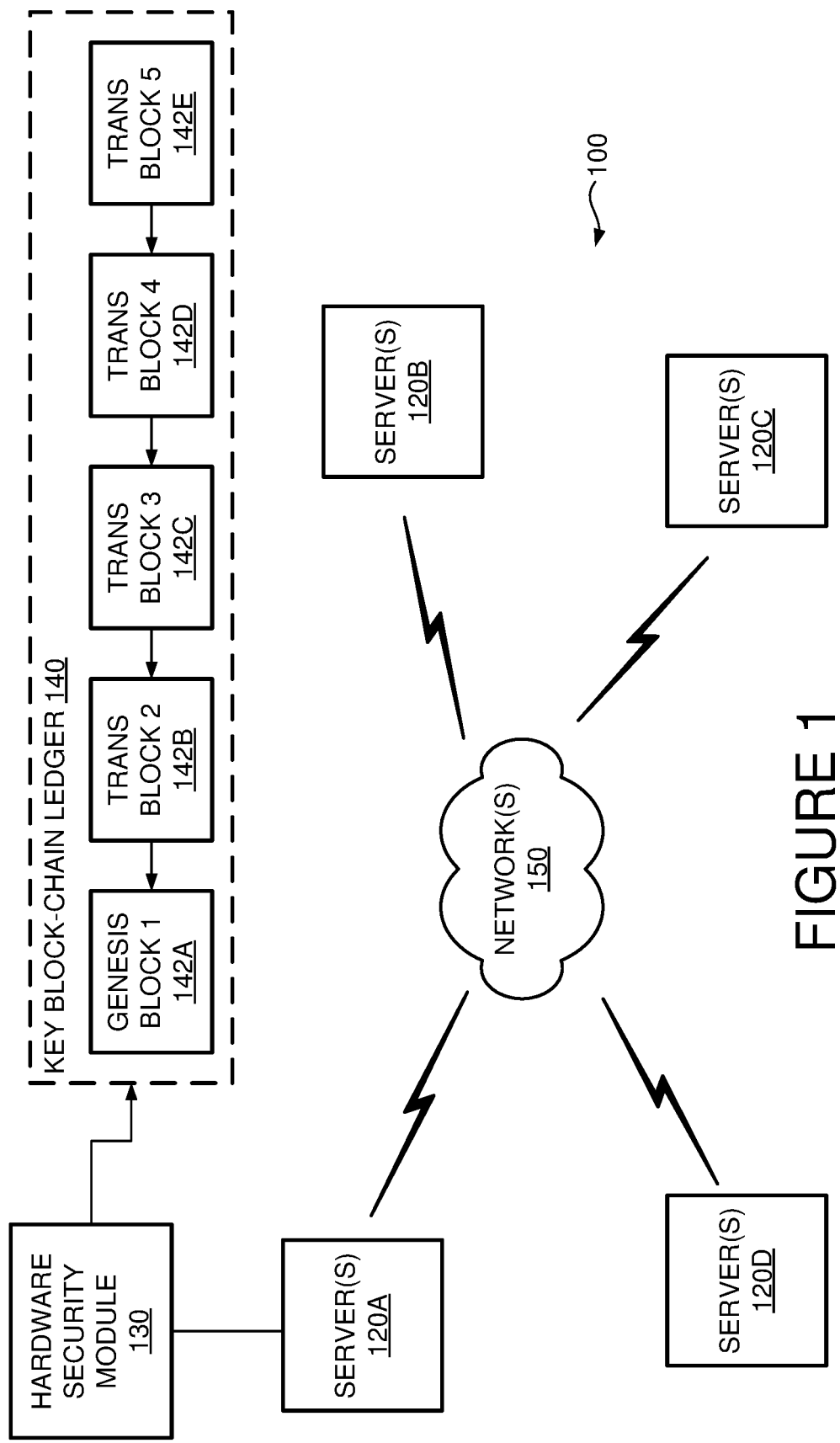
FIG. 1 is an architectural diagram showing an illustrative example of a system for a key block-chain ledger.

The following Detailed Description describes technologies for the use of block-chaining in a key management system to create a key block-chain ledger that may be traced even when a key is modified such that the original key cannot be derived from the modified key. Certain examples use an emend and amend functionality of block-chain technology to add metadata to blocks of the block-chain, the metadata pertaining to key operations of a key transaction event.

Conventionally, a key is typically issued with lifecycle policies pertaining to the key. One common lifecycle policy is a key rotation policy that requires the key to be rotated on a periodic basis, such as annually. For example, the National Institute for Standards and Technology (NIST) states a lifecycle policy that an AES key of 256 bits requires rotation after 2 years. Other examples of key rotation policies also relate to the amount of data to which a key is applied. In another example, NIST states that an AES-GCM-256 key must be rotated after being applied to 64 GB of data even if the 2 year time limit has not been reached.

When keys are rotated, key orthogonality is generally required, i.e. the new key cannot be feasibly derived by an unintended party, human or machine, from the original key. This poses key traceability issues during a key audit. This is a particular problem when the key rotation is performed without derivation from the master key or parent/seed key.

If a key becomes compromised and the key cannot be traced during an audit, then the point of attack, e.g. data, machine, system dependencies used, personnel involved, etc., may not be identifiable. As a result, identifying a security flaw or vulnerability is prevented and deep forensics cannot be performed. The disclosed technology provides a secure key block-chain ledger that enables key traceability. By creating blocks representing key transactions and chaining the blocks in an unbroken block-chain, a secure key block-chain ledger is created. Mechanisms are provided for adding metadata to each block that logs information relevant to the key transaction, e.g. operations performed on the key, data the key was applied to, libraries utilizing the key, and machines where operations were performed on the key or where the key resides. Examples of mechanisms for securely adding metadata to blocks in the block-chain include block-chain emend and amend functionality.

In various examples, the disclosed key block-chain ledger can be used to extend key traceability to certain aspects of a key, such as: how the key is being used; which service the key is related to; historical data logs, e.g. glitches and possible attack attempts; and tracing key usage to a service when it is rotated. Tracing key usage to a service, in particular, is important to supporting data-at-rest in that it relates to the keys associated with the same data and/or keys related to each other or to different data.

In certain simplified examples, a method, system or computer readable medium for key management involves constructing a traceable key block-chain ledger by creating a cryptographic key at a key source, generating a genesis block for a key block-chain ledger corresponding to the cryptographic key, and securely modifying the genesis block to include metadata describing the key source. These examples also involve performing a key transaction with the cryptographic key, generating a transaction block corresponding to the key transaction with the cryptographic key and adding the transaction block to the key block-chain ledger, and securely modifying the transaction block to include metadata describing the key transaction with the cryptographic key.

Certain examples use block-chain emend and amend functionality to securely introduce metadata to the transaction blocks of the key block-chain ledger.

Certain examples trace the key block-chain ledger using the metadata in the transaction blocks to determine a point of attack and generate an alert by detecting an attack on data or a system associated with the cryptographic key, using metadata of the transaction blocks in the key block-chain ledger to trace the cryptographic key to a point of attack, determining a transaction block corresponding to the point of attack, and generating an alert indicating the point of attack with metadata from the transaction block corresponding to the point of attack.

These are simplified examples and many factors may be considered in a traceable key block-chain ledger as will be discussed in greater detail below.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of a key, data associated with a key, or other information pertaining to the key.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, a block-chain is used to provide a ledger for tracing key management information, such as modification or use of the key. Such technologies provide a key ledger through the use of block-chain. Certain configurations may be beneficial in auditing or tracing a key over its lifecycle even when a key is modified in a manner that the original key cannot be derived from the modified key. Among many benefits provided by the technologies described herein, the technologies may provide for a secure distributed block-chain key ledger. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for a traceable key block-chain ledger will be described. As will be described in more detail below with respect to the figures, there are a number of applications and services that may embody the functionality and techniques described herein.

FIG. 1 is an architectural diagram illustrating one example of a system 100 with a key block-chain ledger 140 for a key generated in a hardware security module (HSM) 130. In this example, a set of trusted nodes, server 120A-D, are interconnected via network 150. A private key is created in HSM 130 and a genesis block 142A is produced for a block-chain that establishes a key ledger.

When a private key is created in HSM 130, genesis block 142A for a block-chain is created that includes metadata identifying the source of generation, e.g. HSM 130, and mode of generation for the key, such as the type of key, protocols, etc. The genesis block 142A is signed with a signature that is cryptographically generated using information pertaining to the key. In effect, a signed birth certificate is issued to the key that includes information about the key's generation in addition to checking for proper entropy of the source.

In one example, genesis block 142A is signed with a signature derived from a key value for signing the key certificate and information pertaining to the key and key source information.

When a key transaction occurs, e.g. each time the key is rotated, a transaction block is created, signed and added to the key block-chain ledger 140. In the example of FIG. 1, each of transaction blocks 142B-E represents a key transaction, e.g. key rotation or key use. The key block-chain ledger 140 may be distributed to the nodes of a trusted cluster, e.g. servers 120A-D.

Metadata pertaining to the key transaction, such as references to data, machines, signed kernels, or libraries, is added to the block 142B-E in the key block-chain ledger 140 using secure cryptographic operations to insert and assert information, e.g. to add notes or records to the transaction blocks.

In certain examples of a key block-chain ledger, these secure cryptographic operations may include posteriori emend and posteriori amend. In some examples, specific tags may be added to differentiate amend and emend. In the example of FIG. 1, the blocks 142A-E of key block-chain ledger 140 are subject to the amend and emend operations, which is similar to a block-chain fork except that, in the present technology, the changes may be made by an authorized or trusted party and the mode of change, e.g. amend or emend, is identified. The data introduced by the secure cryptographic operations, e.g. amend or emend operations, is reflected in the transaction blocks of the key block-chain ledger 140, e.g. a specific Merkle tree branch of the transaction blocks of the block-chain.

An amend operation typically adds change data to metadata in a transaction block, but leaves the details of the original historical data unchanged, e.g. new facts are added, no facts replaced. For example, the amend data may indicate that an attempt was detected to cause a data dump on certain ciphered data associated with the key, but back-dated to a known time where the key was valid and the new key has been refreshed N times since the known time when the key was valid.

An emend operation typically indicates that part of the historical data is incorrect and authorized errata data is added to the metadata, e.g. facts are replaced, i.e. disclaimed and re-stated. For example, the policy for use of data associated with the key was discovered to be mis-stated, but the key data has been back-dated to a known time when the key was known to be valid, and the new key has been refreshed N times since that known time.

Note that, conventionally, a block chain is immutable, so it is typically not possible to purge, emend or amend information from the block-chain after the fact. This can be a problem when information is inaccurate or incomplete after the fact. The present technology, in contrast, is scalable when a policy is authorized and amended. This will be specified by the attested and authorized amend mechanism. Hence, the present technology enables deep data forensics to be performed.

Figure 2:
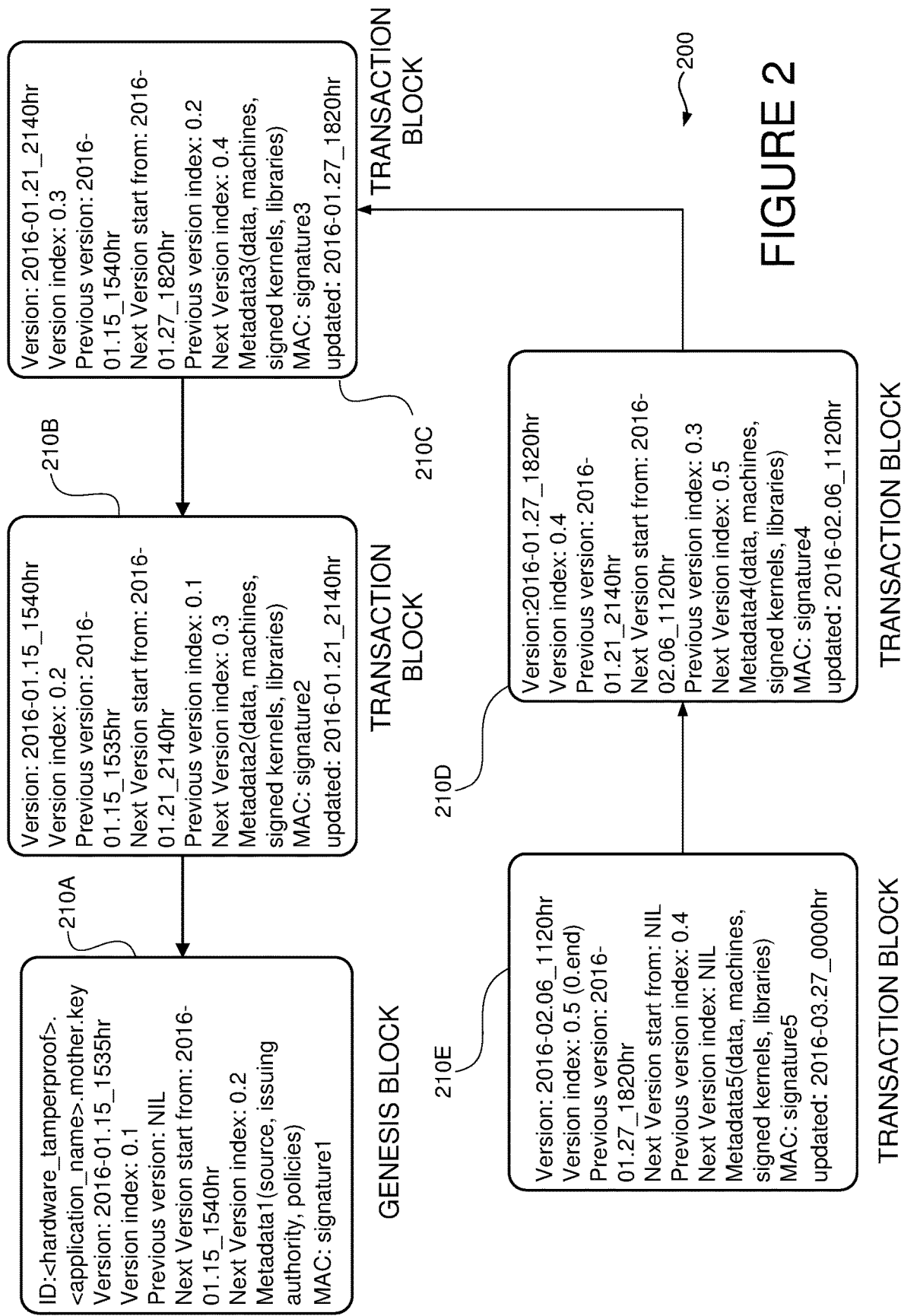
FIG. 2 is a data architecture diagram showing an illustrative example of a key block-chain ledger.

FIG. 2 is a data architecture diagram illustrating a simplified example of a key block-chain ledger 200 based on the blocks 142A-E of the key ledger 140 of FIG. 1. The key block-chain ledger 200 example of FIG. 2 is simplified to show block headers, metadata and signatures of blocks 210A-E in order to demonstrate a traceable secure key ledger using a block-chain. In the example of FIG. 2, a genesis block 210A with ID "<hardware_tamperproof>.<application_name>.mother.key" is generated by HSM 130 of FIG. 1 when a key is created by the HSM.

Figure 3A:
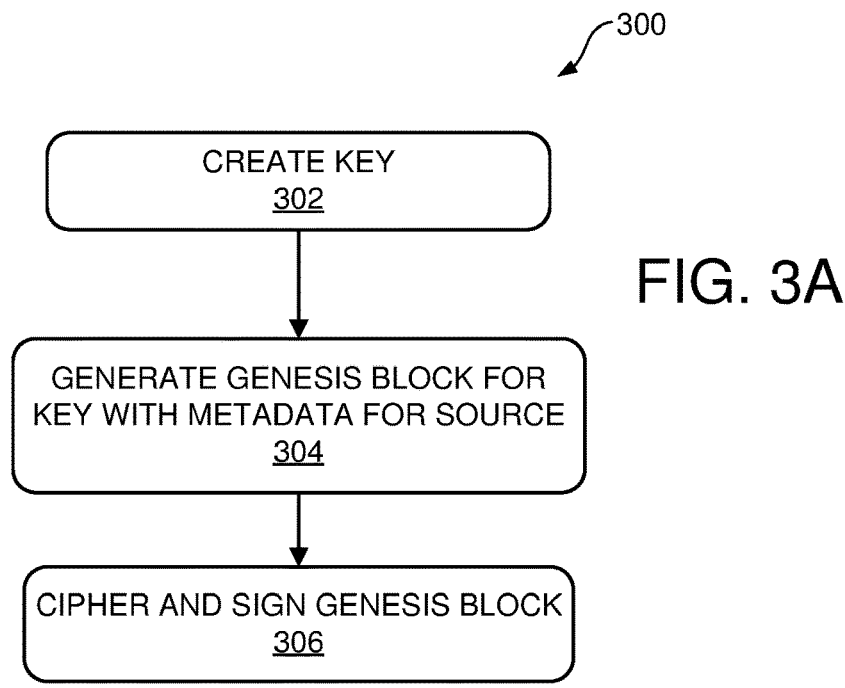
FIGS. 3A and 3B are control flow diagrams showing an illustrative example of a process for creating a key block-chain-ledger.

The control flow diagram of FIG. 3A illustrates one example of a process 300 that generates a genesis block. At 302, a key, such as a public private key pair, is created, e.g. by HSM 130. At 304, genesis block 210A is created for the new key with Metadata1 describing information regarding the origin of the key. In the example shown, Metadata1 includes the source of the key, e.g. HSM 130 and the issuing authority for the key, and policy data for the key, e.g. rotation requirements. At 306, genesis block 210A is ciphered and signed, e.g. by a key management application residing in server 120A, with signature1 to provide a key birth certificate.

Because block 210A is the genesis block, there is no previous block to which the genesis block is chained, e.g. Previous version: NIL. Because genesis block 210A is the only block in the chain at the point of creation, it is also the end block, e.g. Next Version index: NIL.

As key operations occur, e.g. key rotation or key usage, transaction blocks are added to the block-chain 200. Each transaction block contains metadata that includes key traceability information for the key, such as the machine performing the key rotation, data to which the key is applied, machines where the key resides, signed kernels, libraries etc. Each transaction block contains a hash pointer as a link to a previous block, a timestamp and transaction data. A block-chain is inherently resistant to modification of the data, which maintains the integrity of the metadata and enables the key to be traced through its lifetime even when the key is modified such that the original key or an earlier version of the key cannot be derived from a modified form of the key. Note that the metadata may also be a pointer to a location of resources or logs where trace information can be found.

Figure 3B:
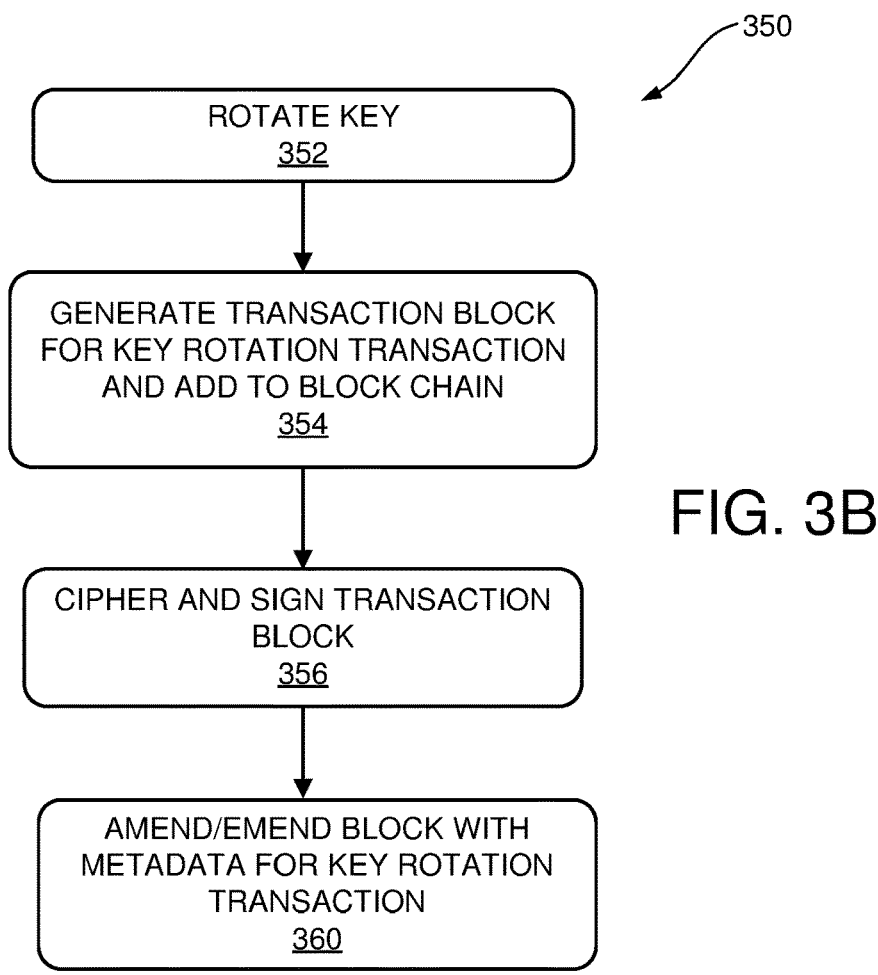

An example of a transaction block creation process 350 is illustrated in the control flow diagram of FIG. 3B in the context of FIG. 2. At 352, when a key transaction event occurs, e.g. the key is applied to data, another transaction block 210B is created, at 354, block-chained to the genesis block 210A, and, at 356, the transaction block is ciphered and signed to assure the authenticity of the transaction block.

At 360, transaction block 210B is emended or amended to include Metadata2, which includes key traceability information pertaining to the key transaction event, such as data, signed kernels or libraries to which the key has been applied or a machine performing the key rotation or a machine where the key resides. The genesis block 210A is emended to include references to transaction block 210B, e.g. Next Version index: 0.2. Transaction block 210B includes a link to the genesis block 210A, e.g. Previous version index: 0.1, and is signed, e.g. signature2.

Similarly, transaction blocks 210C-E are created when subsequent key transaction events occur and the transaction blocks are block-chained into the key block-chain ledger 200 to provide a secure key log that is traceable using the metadata of the transaction blocks. As each block is added, the added block includes a link to the previous block and the previous block is modified to contain a link to the added block.

In the example of FIG. 2, an amend operation is used to add notes (e.g. 0.x is defined as 0.end; e.g. 0.x is derived on new branch). An emend operation is used to state errata (ID: is re-defined/renamed from "<hardware_tamperproof>.<application_name>.mother.key" to "smartcard.mother.key").

In one example of adding metadata to a transaction block 210A-E in the key block-chain ledger 200, a quasi-immutable master key is utilized to emend the transaction blocks 210A-E of ledger 200. In this example, the emend function includes: cipher; signature; and update and may include an original chain lock and an intermediate inter-chain lock to allow amends, which may be separate text in the transaction block 210A-E.

In another example, an immutatable key is assumed for simplicity. This may also pertain to rotating the secure log/ledger key and emend/amend lifecycle status key. Derived keys may also be utilized. The immutable key can also be a quasi-immutable key, like a certificate authority (CA) issued key as an intermediary key with high longevity for use with a secure logger. For example:

key_to_sign_its_own_cert=PBKDF2(quasi-immutable key derived for signing key, indices+resultant_key); and signature=hmac(entropy log/hash of the entropy log+ optional the machine and libraries, etc, key_to_sign_its_own_cert).

The key block-chain ledger 200 may be distributed to a trusted cluster or a public block-chain. Though aspects of the technology disclosed herein resemble a smart contract, in the present techniques, the policy of the contract may determine the way that the key block-chain ledger is maintained. For example, the policy may require that the validation or authorization process is determined by a centralized control of a cluster of trusted nodes. In this case, the centralized control may be a trusted node, such as a certificate authority, authorized to attest and sign the transaction blocks to validate them and validation by miners may not be needed.

Alternatively, the policy may provide for validation process decided by a decentralized cluster of untrusted nodes. In the situation where the key block-chain ledger is distributed to a cluster of untrusted nodes, mining of blocks in the chain may be employed to validate the key block-chain ledger.

One aspect of the key block-chain ledger is that it may permit private keys to be maintained within a single secure entity, such as HSM 130. This can centralize the attack risk to a centralized module where security is the primary focus leaving business functionality using single secure entity as the crypto service provider.

Taken from another perspective, because the key and its profile, e.g. attributes and rules, is an entity, e.g. a legal entity, tied to a service, the key can be viewed as having a value or currency. If the key does not rotate, then the value does not change because the nature of the service does not modify. If the key does rotate, however, then the service changes and the key transaction is logged in the key block-chain ledger, re-hashed, and broadcast to a network of nodes, which may be trusted or untrusted depending on the desired implementation. In an example where the contents of the transaction blocks are maintained as secret, then only the signature for each transaction block is released and mined for public establishment of the key block-chain ledger.

Block-chains may use various time-stamping schemes, such as proof-of-work, to serialize changes. Alternate consensus methods include proof-of-stake and proof-of-burn may also be utilized to serialize changes.

As noted above, in some examples, a key block-chain ledger may be validated by miners to secure the block-chain. In this case, miners may collectively agree on a validation solution to be utilized. However, if a small network is utilized, e.g. private network, then the solution may be a Merkle tree and mining for the validation solution may not be required. When a key is created, it is an unconfirmed and unidentified entity. To be part of the acknowledged "currency", it may be added to the block-chain, and therefore relates to the concept of a trusted cluster.

In a trusted cluster, when a key is rotated, every node competes to acknowledge the next "transaction" (key rotation or emendment/amendment), hence, an immutable key may not be needed. Hence, no single node will sign for the entire cluster on that shared key when each node is competing to rotate and validate the key rotation. In one example, the nodes compete to mine and get the lowest hash value: min{previous_hash, contents_hash, random_nonce_to_be_guess}->result. Transaction order is protected by computational race (faith that no one can beat the network). This is useful if the service profile, e.g. Human Certificate Profile (HCP) or key (entity) is to be acknowledged and established by democratic nodes for establishment. Mutual authentication parameters are broadcast and acknowledged so that there is no double rotation. The same may be true for HCP when the service profile is re-assigned.

By broadcasting the meta-data for authenticating a secret ledger across a restricted network, e.g. only the signed hash is broadcast, the block-chain may reduce the risks that come with data being held centrally. Decentralized consensus makes block-chains suitable for the recording of secret transactions or events. The meta-data, which may contain locations of resources related to the key, may also be ciphered for restricted access so that the meta-data does not disclose network configuration information of the resources pertaining to the key.

The mining process may be utilized to deter double accounting, overriding or replaying attacks, with the community arrangement on the agreement based on the "good faith" that no single node can control the entire cluster. The working assumption for mining is the existence of equivalent power distribution of honest parties with supremacy over dishonest or compromised ones. Every node or miner in a decentralized system has a copy of the block-chain. No centralized "official" copy exists and no user is "trusted" more than any other. Transactions are broadcast to the network using software. Mining nodes validate transactions, add them to the block they are building, and then broadcast the completed block to other nodes.

Note that in a restricted network, stake-holders who are authorized to check or mine for the key lifecycle trace may or may not access the keys themselves, but would have to have keys to the meta-data (since they are members of the restricted network, and are trusted) to get the details. As keys are applied on data with different data classifications, the stake-holders could be segmented.

A decentralized block-chain may also use ad-hoc secure message passing and distributed networking. In this example, the key block-chain ledger may be different from a conventional block-chain in that there is a centralized clearing house, e.g. authorized central control for validation. Without the mining process, the trusted cluster can be contained in a centralized block-chain instead of a public or democratic block-chain. One way to view this is that a decentralized portion is as "democratic N honest parties" (multiparty honest party is a cryptography concept), and a centralized portion as a "trusted monarchy for block-chain information correction". There may be advantages to maintaining the emend and amend mechanisms as centrally authorized and kept offline similar the root certification authority for the key.

In some examples, access to a distributed traceable key block-chain ledger may be restricted by cryptographic means to be only open to authorized servers. Since the key block-chain ledger is distributed, the authorized servers can validate it. A public key may be used as an address on the key block-chain.

Note that growth of a decentralized block-chain may be accompanied by the risk of node centralization because the computer resources required to operate on bigger data become increasingly expensive.

Figure 3C:
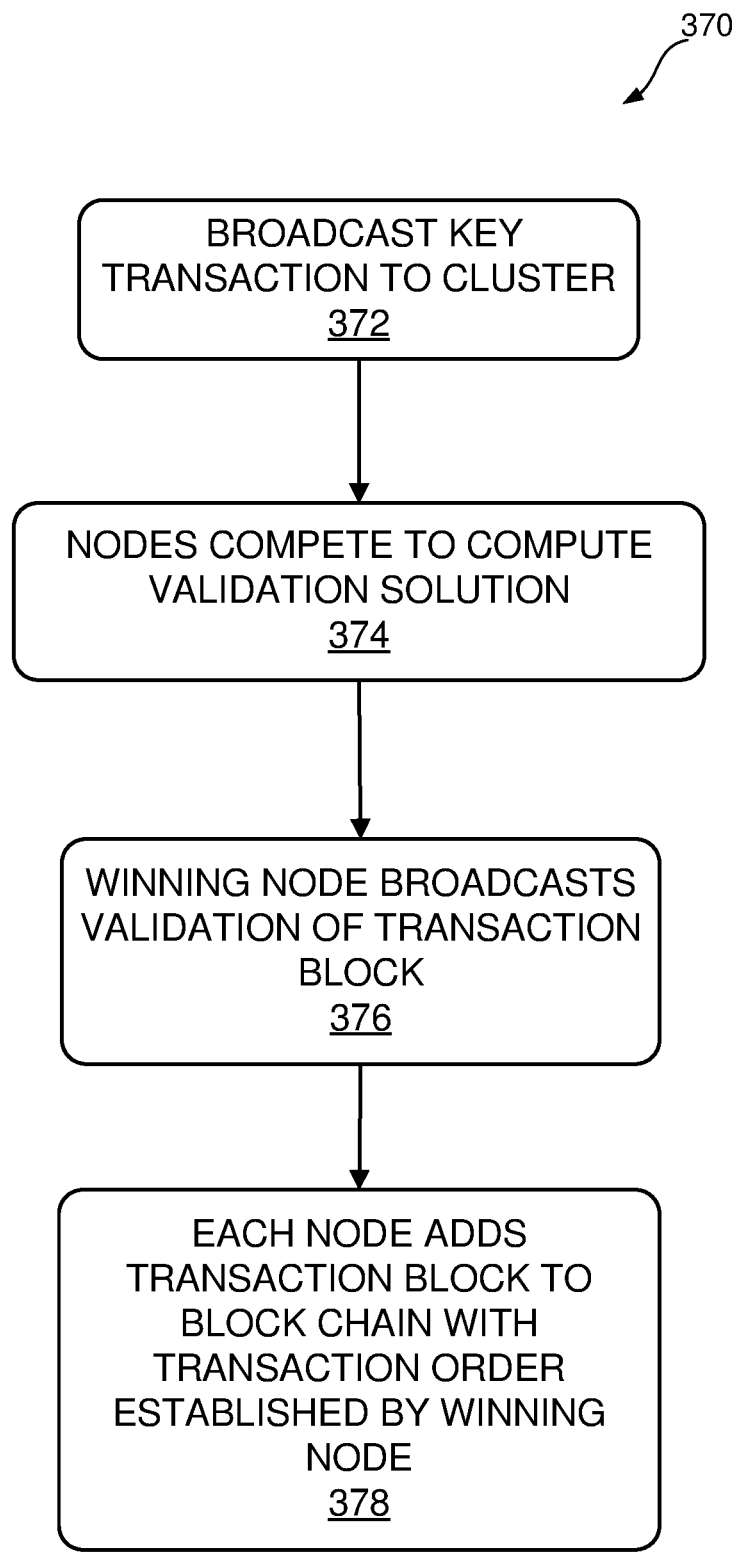
FIG. 3C is a control flow diagram showing an illustrative example of a validation process for a key block-chain ledger distributed to untrusted nodes.

FIG. 3C is a control flow diagram illustrating an example of a validation process 370 for a key block-chain ledger distributed to untrusted nodes. In process 370, when a transaction block is created for a key transaction, the key transaction is broadcast, at 372, to the cluster of untrusted nodes. At 374, nodes compete to compute a validation solution for the transaction. At 376, a winning node broadcasts the validation solution for the transaction block and adds the transaction block to its copy of the key block-chain ledger. At 378, in response to the winning node's broadcast, the other nodes add the transaction block to their copies of the key block-chain ledger in the transaction order established by the winning node. The decentralized validation protocol maintains the integrity of the key block-chain ledger.

Figure 4:
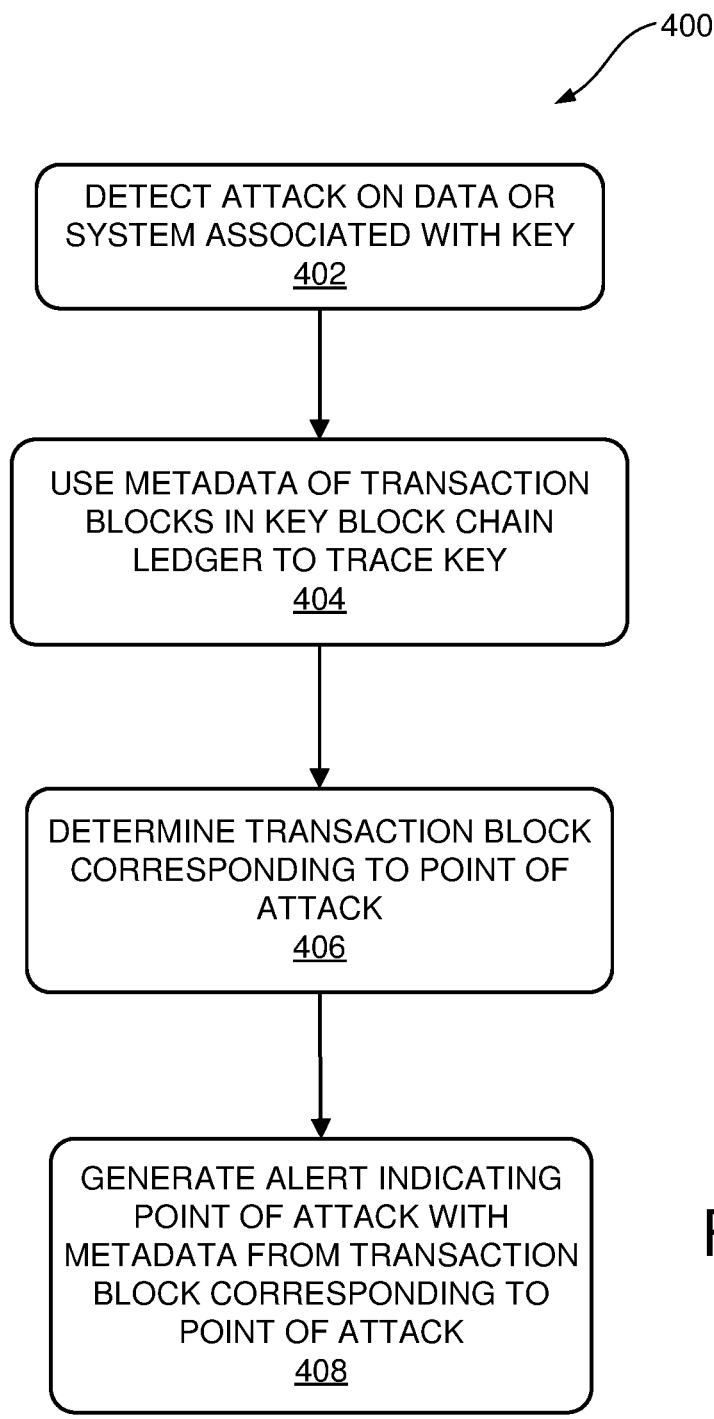
FIG. 4 is a control flow diagram showing an illustrative example of a validation process for a key block-chain ledger.

FIG. 4 is a control flow diagram showing an illustrative example of a key trace process 400 using a key block-chain ledger of the disclosed technology. The key may be traced even if has been rotated and the key rotation is performed without derivation from the master key or the parent or seed key, e.g. key orthogonality has been maintained. In this example, at 402, an attack on data or systems protected by a key is detected, where the key has a key block-chain ledger as described above. At 404, the blocks of the key block-chain ledger may be traced to the origin, e.g. genesis block, for the key using the metadata of the transaction blocks.

At 406, using the metadata from the key block-chain ledger, the transaction block corresponding to the point of attack on the key or the transaction block relating to the last point at which the key was valid is determined. At 408, an alert is generated indicating the point of attack identified using the metadata from the key block-chain ledger. Alternatively, the alert may indicate that point at which the key was last valid for use in determining which entities, e.g. data, DLL, signed kernels, or systems that may have been compromised by the attack.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a traceable key block-chain ledger. The specific examples of different aspects of a traceable key block-chain ledger described herein are illustrative and are not intended to limit the scope of the techniques shown.

Figure 6:
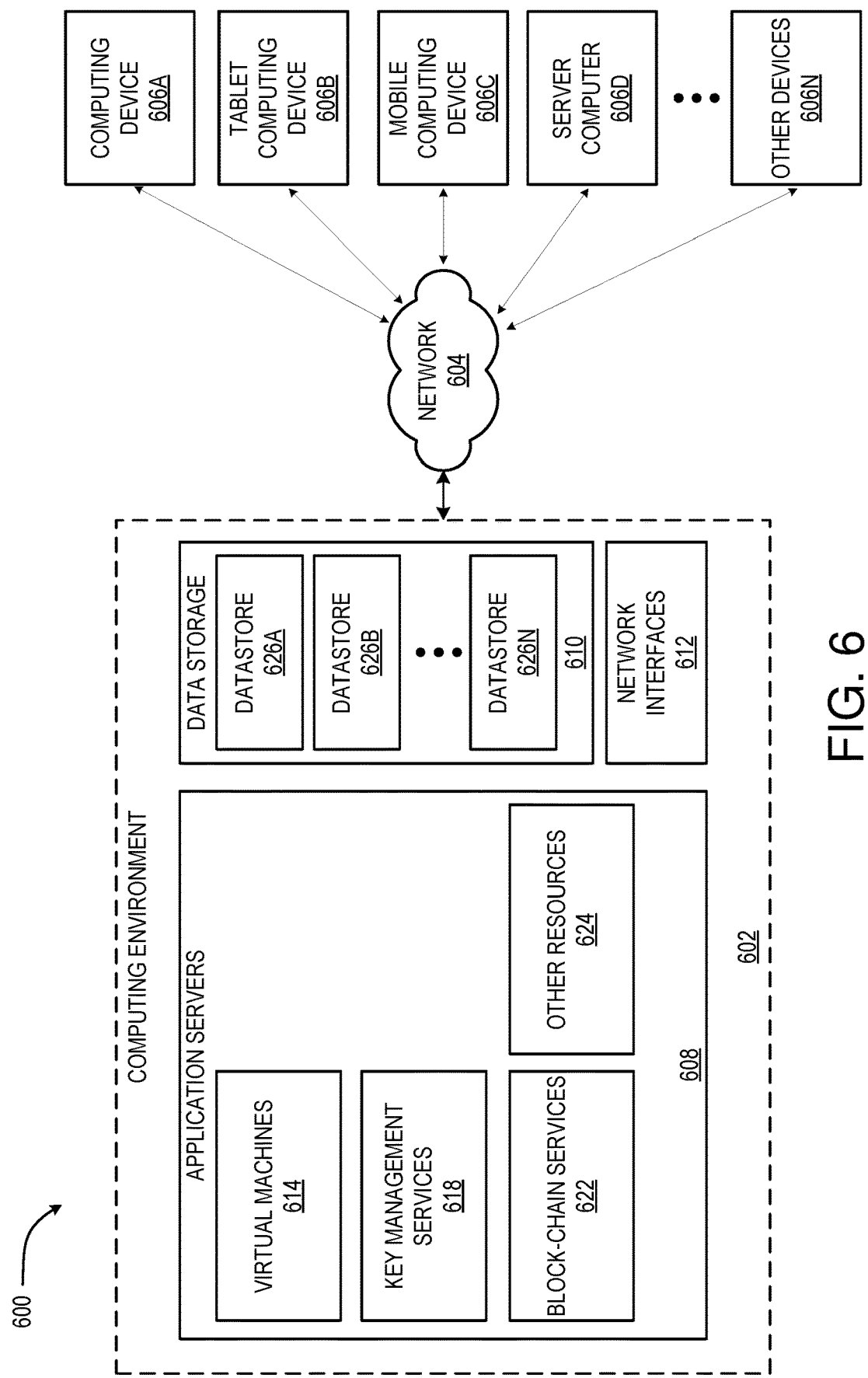
FIG. 6 is a diagram illustrating a distributed computing environment capable of implementing aspects of the techniques and technologies presented herein.

Note that at least parts of processes 200, 300, 350 and 400, and other processes described herein may be implemented in a server, such as computer environment 602 in FIG. 6, or the cloud, and data defining the results of the user controls signals translated or interpreted as discussed herein may be communicated to a user device for display. Alternatively, the traceable key block-chain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (200, 300, 350 and 400) are described herein as being implemented, at least in part, by an application, component, and/or circuit. Although the following illustration refers to the components of FIGS. 1, 5, 6 and 7, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of FIGS. 1, 5, 6 and 7, it can be appreciated that the operations of the routines (200, 300, 350, 370 and 400) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
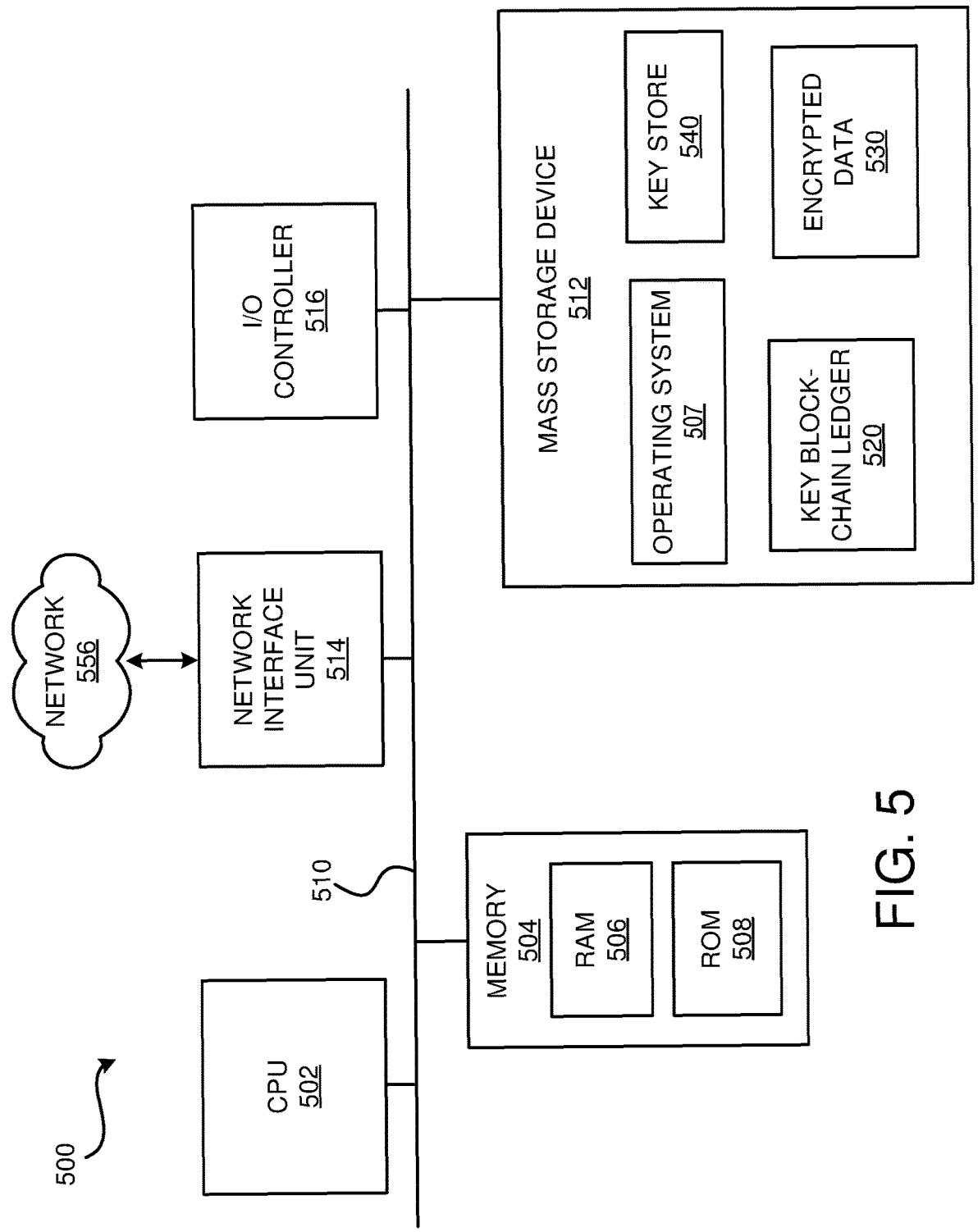
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the servers 120A-D (FIG. 1), capable of executing the program components described herein. Thus, the computer architecture 500 illustrated in FIG. 5 illustrates an architecture for a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data, such as key block-chain ledger data 520 and encrypted data 530, key store 540, and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for a traceable key block-chain ledger. Thus, the distributed computing environment 600 illustrated in FIG. 6 can be utilized to execute many aspects of the software components presented herein. For example, the distributed computing environment 600 can be utilized to execute one or more aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-606N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 6. It should be understood that the illustrated devices 606 and computing architectures illustrated and described herein are illustrative only, and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for a traceable key block-chain ledger. It should be understood that this configuration is illustrative only, and should not be construed as being limiting in any way.

According to various implementations, the application servers 608 also include one or more key management services 618 and one or more block-chain services 620. The key management services 618 can include services for managing keys used for encrypting data and communications. The block-chain services 620 can include services for participating in management of one or more block-chains, such as by creating genesis blocks, transaction blocks, and performing validation.

As shown in FIG. 6, the application servers 608 also can host other services, applications, portals, and/or other resources ("other resources") 624. The other resources 624 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-626N (hereinafter referred to collectively and/or generically as "datastores 626"). The datastores 626 are configured to host data used or created by the application servers 608 and/or other data. Aspects of the datastores 626 may be associated with a service for securely encrypting and storing files using encryption keys. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for a traceable key block-chain ledger, among other aspects.

Turning now to FIG. 7, an illustrative computing device architecture 700 for a computing device that is capable of executing various software components is described herein for a traceable key block-chain ledger. The computing device architecture 700 is applicable to computing devices that manage secure data. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the servers 120A-D shown in FIG. 1 and computing device 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, MAC OS or IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 556 of FIG. 5. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UNITS network and an LTE network).

The network 756 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below, or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented key tracing method comprising:
responsive to detection of an attack on a resource protected by a cryptographic key, retrieving a key block-chain ledger corresponding to the cryptographic key, the key block-chain ledger having one or more transaction blocks, where each transaction block corresponds to a key transaction with the cryptographic key and includes metadata describing the key transaction with the cryptographic key;
using metadata from the transaction blocks in the key block-chain ledger to trace the key transactions of the cryptographic key to a point of attack;
determining a transaction block corresponding to the point of attack; and
generating an alert indicating the point of attack with metadata from the transaction block corresponding to the point of attack.

2. The key trace method of claim 1, wherein the metadata comprises information for one or more of a machine that performed a rotation of the key, a machine that utilized the key for a transaction, a machine where the key resided, a source where the key originated, a data set encrypted using the key, a kernel signed with the key, a library encrypted using the key, a Dynamically Linked Library encrypted using the key, a service that utilized the key, a user that utilized the key, a domain that utilized the key.

3. The key trace method of claim 1, wherein the alert indicating the point of attack with metadata from the transaction block corresponding to the point of attack includes information for one or more of the machine that performed the rotation of the key, the machine that utilized the key for the transaction, the machine where the key resided, the source where the key originated, the data set encrypted using the key, the kernel signed with the key, the library encrypted using the key, the Dynamically Linked Library encrypted using the key, the service that utilized the key, the user that utilized the key, and the domain that utilized the key.

4. The key trace method of claim 1, wherein the metadata comprises a pointer to a location of a resource or log where trace information can be found.

5. The key trace method of claim 4, wherein the alert indicating the point of attack with metadata from the transaction block corresponding to the point of attack includes the pointer to the location of the resource or log where trace information can be found.

6. The key trace method of claim 1, wherein the step of determining a transaction block corresponding to the point of attack comprises determining a transaction block corresponding to the last transaction at which the key was valid.

7. The key trace method of claim 1, wherein access to the key block-chain ledger or the metadata is restricted by cryptographic means to one or more authorized servers.

8. A system for key tracing, the system comprising:
one or more processors; and
one or more memory devices in communication with the one or more processors, the memory devices having computer-readable instructions stored thereupon that, when executed by the processors, cause the processors to:
responsive to detection of an attack on a resource protected by a cryptographic key, retrieve a key block-chain ledger corresponding to the cryptographic key, the key block-chain ledger having one or more transaction blocks, where each transaction block corresponds to a key transaction with the cryptographic key and includes metadata describing the key transaction with the cryptographic key;
trace the key transactions of the cryptographic key to a point of attack using metadata from the transaction blocks in the key block-chain ledger;
determine a transaction block corresponding to the point of attack; and
generate an alert indicating the point of attack with metadata from the transaction block corresponding to the point of attack.

9. The system for key tracing of claim 8, wherein the metadata comprises information for one or more of a machine that performed a rotation of the key, a machine that utilized the key for a transaction, a machine where the key resided, a source where the key originated, a data set encrypted using the key, a kernel signed with the key, a library encrypted using the key, a Dynamically Linked Library encrypted using the key, a service that utilized the key, a user that utilized the key, a domain that utilized the key.

10. The system for key tracing of claim 9, wherein the alert indicating the point of attack with metadata from the transaction block corresponding to the point of attack includes information for one or more of the machine that performed the rotation of the key, the machine that utilized the key for the transaction, the machine where the key resided, the source where the key originated, the data set encrypted using the key, the kernel signed with the key, the library encrypted using the key, the Dynamically Linked Library encrypted using the key, the service that utilized the key, the user that utilized the key, and the domain that utilized the key.

11. The system for key tracing of claim 8, wherein the metadata comprises a pointer to a location of a resource or log where trace information can be found.

12. The system for key tracing of claim 11, wherein the alert indicating the point of attack with metadata from the transaction block corresponding to the point of attack includes the pointer to the location of the resource or log where trace information can be found.

13. The system for key tracing of claim 8, wherein the operation to determine a transaction block corresponding to the point of attack operates to determine a transaction block corresponding to the last transaction at which the key was valid.

14. The key trace method of claim 8, wherein access to the key block-chain ledger or the metadata is restricted by cryptographic means to one or more authorized servers.

15. A computer storage medium having computer executable instructions stored thereon which, when executed by one or more processors, cause the processors to execute a key trace method comprising:
responsive to detection of an attack on a resource protected by a cryptographic key, retrieving a key block-chain ledger corresponding to the cryptographic key, the key block-chain ledger having one or more transaction blocks, where each transaction block corresponds to a key transaction with the cryptographic key and includes metadata describing the key transaction with the cryptographic key;
using metadata from the transaction blocks in the key block-chain ledger to trace the key transactions of the cryptographic key to a point of attack;
determining a transaction block corresponding to the point of attack; and
generating an alert indicating the point of attack with metadata from the transaction block corresponding to the point of attack.

16. The computer storage medium of claim 15, wherein the metadata comprises information for one or more of a machine that performed a rotation of the key, a machine that utilized the key for a transaction, a machine where the key resided, a source where the key originated, a data set encrypted using the key, a kernel signed with the key, a library encrypted using the key, a Dynamically Linked Library encrypted using the key, a service that utilized the key, a user that utilized the key, a domain that utilized the key.

17. The computer storage medium of claim 16, wherein the alert indicating the point of attack with metadata from the transaction block corresponding to the point of attack includes information for one or more of the machine that performed the rotation of the key, the machine that utilized the key for the transaction, the machine where the key resided, the source where the key originated, the data set encrypted using the key, the kernel signed with the key, the library encrypted using the key, the Dynamically Linked Library encrypted using the key, the service that utilized the key, the user that utilized the key, and the domain that utilized the key.

18. The computer storage medium of claim 15, wherein the metadata comprises a pointer to a location of a resource or log where trace information can be found.

19. The computer storage medium of claim 18, wherein the alert indicating the point of attack with metadata from the transaction block corresponding to the point of attack includes the pointer to the location of the resource or log where trace information can be found.

20. The computer storage medium of claim 15, wherein the step of determining a transaction block corresponding to the point of attack comprises determining a transaction block corresponding to the last transaction at which the key was valid.

\* \* \* \* \*